(12) United States Patent
Mikhail et al.

(10) Patent No.: US 8,101,319 B2
(45) Date of Patent: *Jan. 24, 2012

(54) APPROACH TO MAKE A HIGH PERFORMANCE MEMBRANE ELECTRODE ASSEMBLY (MEA) FOR A PEM FUEL CELL

(75) Inventors: Youssef M Mikhail, Sterling Heights, MI (US); Gayatri Vyas, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2279 days.

This patent is subject to a terminal disclaimer.

(21) Appl. No.: 10/850,550

(22) Filed: May 20, 2004

(65) Prior Publication Data

US 2005/0260484 A1 Nov. 24, 2005

(51) Int. Cl.
*H01M 2/14* (2006.01)
*H01M 8/04* (2006.01)
*H01M 8/10* (2006.01)
*H01M 8/02* (2006.01)
*B32B 3/26* (2006.01)

(52) U.S. Cl. ..... 429/512; 429/479; 429/490; 428/317.9; 428/319.1

(58) Field of Classification Search ............ 429/44, 429/38, 39, 34, 42, 40; 427/115, 123
See application file for complete search history.

(56) References Cited

U.S. PATENT DOCUMENTS

| | | | |
|---|---|---|---|
| 4,519,065 A | 5/1985 | Lewis et al. | |
| 4,973,358 A | 11/1990 | Jin et al. | |
| 5,036,252 A | 7/1991 | Lob | |
| 5,086,035 A | 2/1992 | Hung et al. | |
| 5,252,410 A | 10/1993 | Wilkinson et al. | 429/33 |
| 5,554,178 A | 9/1996 | Dahl et al. | |
| 5,707,755 A | 1/1998 | Grot | |
| 5,726,524 A | 3/1998 | Debe | |
| 5,786,068 A | 7/1998 | Dorfman et al. | |
| 5,888,593 A | 3/1999 | Petrmichl et al. | |
| 6,051,117 A | 4/2000 | Novak et al. | |
| 6,096,450 A | 8/2000 | Walsh | |
| 6,103,413 A | 8/2000 | Hinton et al. | |
| 6,248,467 B1 | 6/2001 | Wilson et al. | |

(Continued)

FOREIGN PATENT DOCUMENTS

JP 2000-123842 * 4/2000

(Continued)

OTHER PUBLICATIONS

Chen, Yang-Tse et al., "Vapor Deposited Thin Gold Coatings for High Temperature Electrical Contacts," IEEE, pp. 404-413 (1996).

(Continued)

*Primary Examiner* — Barbara Gilliam
*Assistant Examiner* — Angela Martin
(74) *Attorney, Agent, or Firm* — Harness, Dickey & Pierce, P.L.C.

(57) ABSTRACT

An electrically conductive fluid distribution element for use in a fuel cell having a conductive non-metallic porous media having a surface with an electrically conductive metal deposited along one or more metallized regions. The metallized regions are arranged to contact a membrane electrode assembly (MEA) in a fuel cell assembly, and thus improve electrical conductance at contact regions between the MEA and the fluid distribution media. Methods of making such a fluid distribution element and operating fuel cell assemblies are also provided.

10 Claims, 10 Drawing Sheets

U.S. PATENT DOCUMENTS

| | | | |
|---|---|---|---|
| RE37,284 E | 7/2001 | Li et al. | |
| 6,291,094 B1 | 9/2001 | Yoshimura et al. | |
| 6,335,120 B1 | 1/2002 | Bernard et al. | |
| 6,350,539 B1 | 2/2002 | Wood, III et al. | |
| 6,372,376 B1 * | 4/2002 | Fronk et al. | 429/41 |
| 6,426,863 B1 | 7/2002 | Munshi | |
| 6,440,597 B1 | 8/2002 | Mizuno | |
| 6,613,468 B2 * | 9/2003 | Simpkins et al. | 429/34 |
| 6,649,030 B1 | 11/2003 | Tesar | |
| 6,716,549 B2 * | 4/2004 | Bai et al. | 429/34 |
| 6,720,104 B2 | 4/2004 | Zuber et al. | |
| 6,723,462 B2 | 4/2004 | Fan et al. | |
| 6,866,958 B2 | 3/2005 | Vyas et al. | |
| 6,887,610 B2 | 5/2005 | Elhamid et al. | |
| 6,921,598 B2 | 7/2005 | Yamamota et al. | 429/34 |
| 6,939,636 B2 * | 9/2005 | Fuglevand et al. | 429/26 |
| 7,056,608 B2 * | 6/2006 | Lloyd et al. | 429/12 |
| 7,056,613 B2 * | 6/2006 | Bai et al. | 429/34 |
| 7,060,384 B2 * | 6/2006 | Yoshida et al. | 429/42 |
| 2002/0081478 A1 | 6/2002 | Busenbender | |
| 2002/0086197 A1 | 7/2002 | Breuer et al. | |
| 2002/0127465 A1 * | 9/2002 | Forderer et al. | 429/44 |
| 2003/0096151 A1 | 5/2003 | Blunk et al. | |
| 2004/0067407 A1 | 4/2004 | Sompalli et al. | |
| 2005/0100771 A1 | 5/2005 | Vyas et al. | |
| 2005/0100774 A1 * | 5/2005 | Abd Elhamid et al. | 429/34 |
| 2006/0046125 A1 | 3/2006 | Lai | 429/34 |
| 2007/0087176 A1 * | 4/2007 | Dadheech et al. | 428/216 |

FOREIGN PATENT DOCUMENTS

| | | | |
|---|---|---|---|
| JP | 2001-196080 | | 7/2001 |
| JP | 2002-313359 | | 10/2002 |
| JP | 2002-343368 | | 11/2002 |
| JP | 2003-123770 | * | 4/2003 |
| WO | WO03/079477 | | 9/2003 |
| WO | WO 03/105254 | | 12/2003 |
| WO | WO 03/105254 A1 | * | 12/2003 |
| WO | WO 2005/048375 | | 5/2005 |
| WO | WO 2005/117173 | | 12/2005 |

OTHER PUBLICATIONS

Final Office Action issued Aug. 3, 2006 in U.S. Appl. No. 10/704,015.

Final Office Action issued Feb. 7, 2006 in U.S. Appl. No. 10/703,299.

Final Office Action issued Jul. 19, 2007 in U.S. Appl. No. 10/703,299.

Hornung, R. et al., "Bipolar Plate Materials Development Using Fe-based Alloys for Solid Polymer Fuel Cells," Journal of Power Sources, vol. 72, pp. 20-21 (1998).

International Search Report mailed Aug. 5, 2003 in PCT/US03/17039.

Non-Final Office Action issued Aug. 16, 2005 in U.S. Appl. No. 10/703,299.

Non-Final Office Action issued Aug. 21, 2003 in U.S. Appl. No. 10/163,393.

Non-Final Office Action issued Feb. 20, 2004 in U.S. Appl. No. 10/163,393.

Non-Final Office Action issued Feb. 20, 2007 in U.S. Appl. No. 10/704,015.

Non-Final Office Action issued Feb. 6, 2007 in U.S. Appl. No. 10/703,299.

Non-Final Office Action issued Jul. 6, 2006 in U.S. Appl. No. 10/703,299.

Non-Final Office Action issued Mar. 6, 2006 in U.S. Appl. No. 10/704,015.

Notice of Allowability issued on Nov. 2, 2004 in U.S. Appl. No. 10/163,393.

* cited by examiner

APPROACH TO MAKE A HIGH PERFORMANCE MEMBRANE ELECTRODE ASSEMBLY (MEA) FOR A PEM FUEL CELL

FIELD OF THE INVENTION

The present invention relates to electrochemical cells, and more particularly to electrically conductive fluid distribution elements and the manufacture and operation of fuel cells incorporating such fluid distribution elements.

BACKGROUND OF THE INVENTION

Fuel cells have been proposed as a power source for electric vehicles and other applications. One known fuel cell is the PEM (i.e., Proton Exchange Membrane) fuel cell that includes a so-called MEA ("membrane-electrode-assembly") comprising a thin, solid polymer membrane-electrolyte having an anode on one face and a cathode on the opposite face. The anode and cathode typically comprise finely divided carbon particles, very finely divided catalytic particles supported on the internal and external surfaces of the carbon particles, and proton conductive material intermingled with the catalytic and carbon particles. The MEA is sandwiched between gas diffusion media layers and a pair of electrically conductive contact elements which serve as current collectors for the anode and cathode, which may contain appropriate channels and openings therein for distributing the fuel cell's gaseous reactants (i.e. $H_2$ and $O_2$/air) over the surfaces of the respective anode and cathode.

Bipolar PEM fuel cell stacks comprise a plurality of the MEAs stacked together in electrical series while being separated one from the next by such current collector contact elements, which are further impermeable separator elements, known as bipolar plates. The bipolar plate has two working surfaces, one confronting the anode of one cell and the other confronting the cathode on the next adjacent cell in the stack, and electrically conducts current between the adjacent cells. Contact elements at the ends of the stack contact only the end cells and are referred to as end plates.

Electrical contact elements are often constructed from electrically conductive metal materials. In an $H_2$ and $O_2$/air PEM fuel cell environment, the bipolar plates and other contact elements (e.g., end plates) are in constant contact with highly acidic solutions (pH 3-5) and operate in a highly oxidizing environment, being polarized to a maximum of about +1 V (vs. the normal hydrogen electrode). On the cathode side the contact elements are exposed to pressurized air, and on the anode side exposed to super atmospheric hydrogen. Unfortunately, many metals are susceptible to corrosion in the hostile PEM fuel cell environment, and contact elements made therefrom either dissolve (e.g., in the case of aluminum), or form highly electrically resistive, passivating oxide films on their surface (e.g., in the case of titanium or stainless steel) that increases the internal resistance of the fuel cell and reduces its performance. Further, maintaining electrical conductivity through the gas diffusion media to the contact elements is of great importance in maintaining the flow of electrical current from each fuel cell. Thus, there is a need to provide electrically conductive elements that maintain electrical conductivity, resist the fuel cell hostile environment, and improve overall operational efficiency of a fuel cell.

SUMMARY OF THE INVENTION

One aspect of the present invention relates to a fluid distribution element for a fuel cell having a membrane electrode assembly (MEA), the element comprising a layer of electrically conductive porous media comprising carbon and one or more metallized regions on a surface of the layer confronting the MEA. The one or more metallized regions comprise an electrically conductive metal. Further, the one or more metallized regions contact a major surface of the MEA and form respective electrically conductive paths between the MEA and the porous media.

Another aspect of the present invention is a fuel cell assembly comprising a membrane electrode assembly (MEA) comprising an electrically conductive electrode. A layer of electrically conductive non-metallic porous media has a surface that faces the electrode. The surface also has one or more metallized regions comprising an electrically conductive metal. The conductive electrode is arranged in contact with the metallized regions to provide electrical contact between the layer and the conductive electrode. Thus, an electrical contact resistance between the electrode and the metallized regions of the layer is less as when compared to a comparative non-metallized layer of porous media.

Yet another aspect of the present invention relates to a method of operating a fuel cell comprising positioning an electrically conductive porous media layer between a membrane electrode assembly (MEA) and an electrically conductive substrate. The porous media layer has a first surface having ultra-thin metallized regions facing the MEA and a second surface that faces the conductive substrate. The metallized regions of the first surface are contacted with the MEA and the second surface is contacted with the substrate to form an electrically conductive path from the substrate through the porous media to the MEA. Electrons are conducted to or from the MEA via the path while operating the fuel cell.

In yet another aspect of the present invention, a method is provided for manufacturing an assembly for a fuel cell, comprising depositing an electrically conductive metal on a surface of an electrically conductive porous media to form one or more metallized regions having an ultra-thin thickness. The surface having the metallized regions is positioned adjacent to an electrode of a membrane electrode assembly (MEA). The electrode is contacted with the surface having the metallized regions to form an electrically conductive path between the substrate and the porous media.

In another aspect, the present invention provides a fuel cell assembly comprising a membrane electrode assembly (MEA) which comprises a first electrically conductive electrode and a second and opposite electrically conductive electrode. A first layer of electrically conductive non-metallic porous media has a surface facing and arranged in contact with the first electrode. The surface of the first layer has one or more metallized regions comprising an electrically conductive metal. A second layer of electrically conductive non-metallic porous media has a surface facing and arranged in contact with the second electrode, where the surface has one or more metallized regions comprising an electrically conductive metal. An electrical contact resistance between the first layer of porous media through the MEA to the second layer of porous media is less as when compared to a comparative assembly comprising a non-metallized first layer of porous media and a non-metallized second layer of porous media surrounding a similar MEA.

Further areas of applicability of the present invention will become apparent from the detailed description provided hereinafter. It should be understood that the detailed description and specific examples, while indicating the preferred embodi-

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
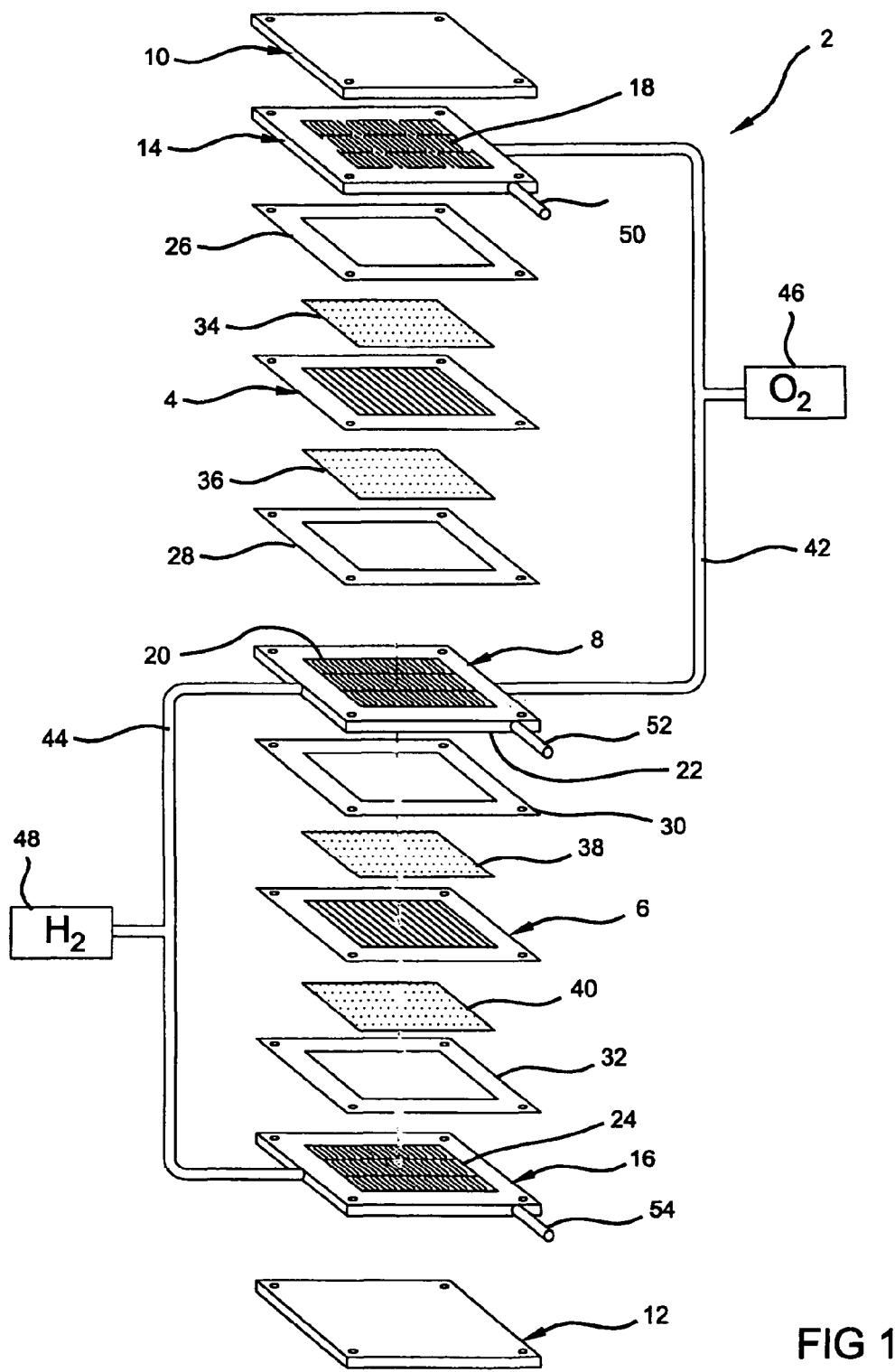
FIG. 1 is a schematic, exploded illustration of a PEM fuel cell stack (only two cells shown)

The present invention relates to an electroconductive fuel cell element, and more particularly to an improved fluid distribution media element for use in a fuel cell. For a better understanding of the present invention, a brief background is provided herein. FIG. 1 depicts a conventional two cell, bipolar fuel cell stack 2 having a pair of membrane-electrode-assemblies (MEAs) 4 and 6 separated from each other by an electrically conductive fluid distribution element 8, hereinafter bipolar plate 8. The MEAs 4 and 6 and bipolar plate 8, are stacked together between stainless steel clamping plates, or end plates 10 and 12, and end contact elements 14 and 16. The end contact elements 14 and 16, as well as both working faces of the bipolar plate 8, contain a plurality of grooves or channels 18, 20, 22, and 24, respectively, for distributing fuel and oxidant gases (i.e. $H_2$ and $O_2$) to the MEAs 4 and 6. Nonconductive gaskets 26, 28, 30, and 32 provide seals and electrical insulation between the several components of the fuel cell stack. Gas permeable conductive materials are typically carbon/graphite diffusion papers 34, 36, 38, and 40 that press up against the electrode faces of the MEAs 4 and 6. The end contact elements 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6. Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, ambient air may be supplied using a compressor or blower to the cathode side as an oxygen source and hydrogen to the anode from a methanol or gasoline reformer, or the like. Exhaust plumbing (not shown) for both the $H_2$ and $O_2$ sides of the MEAs 4 and 6 will also be provided. Additional plumbing 50, 52, and 54 is provided for supplying liquid coolant to the bipolar plate 8 and end plates 14 and 16. Appropriate plumbing for exhausting coolant from the bipolar plate 8 and end plates 14 and 16 is also provided, but not shown.

Figure 2:
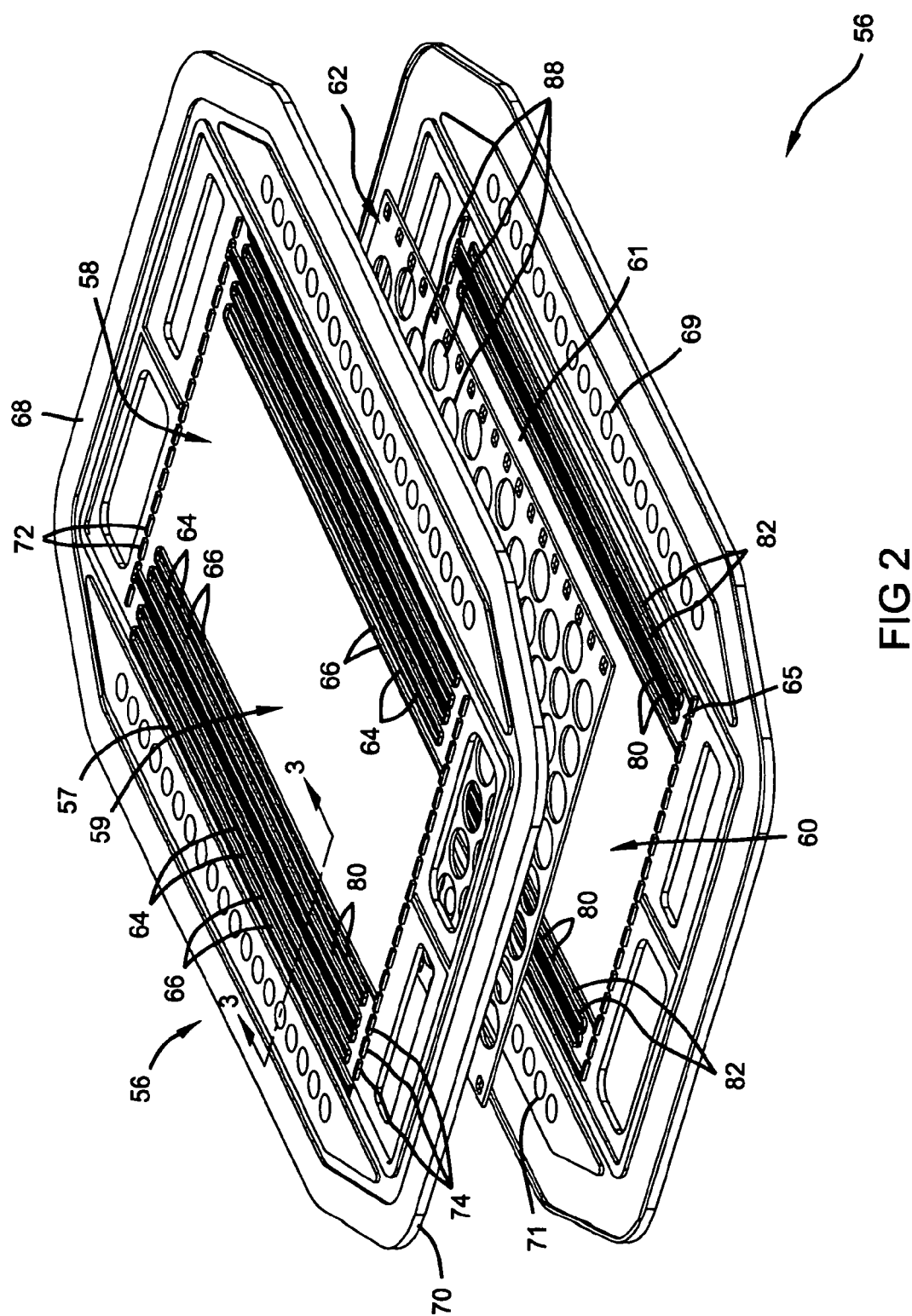
FIG. 2 is an exploded view of an exemplary electrically conductive fluid distribution element useful with PEM fuel cell stacks.

FIG. 2 is an exploded view of an exemplary bipolar plate 56 that may be used in accordance with a first embodiment of the present invention. The bipolar plate 56 comprises a first exterior metal sheet 58, a second exterior metal sheet 60, and an interior spacer metal sheet 62 interjacent the first metal sheet 58 and the second metal sheet 60. The exterior metal sheets 58 and 60 are made as thin as possible and may be formed by stamping, or any other conventional process for shaping sheet metal. The external sheet 58 has a first working face 59 on the outside thereof which confronts a membrane electrode assembly (not shown) and is formed so as to provide a flow field 57. The flow field 57 is defined by a plurality of lands 64 which define therebetween a plurality of grooves 66 which constitutes the "flow field" through which the fuel cell's reactant gases (i.e. $H_2$ or $O_2$) flow in a meandering path from one side 68 of the bipolar plate to the other side 70 thereof. When the fuel cell is fully assembled, the lands 64 press against the porous material, carbon/graphite papers 36 or 38 which, in turn, press against the MEAs 4 and 6. For simplicity, FIG. 2 depicts only two arrays of lands and grooves. In reality, the lands and grooves will cover the entire external faces of the metal sheets 58 and 60 that engage the carbon/graphite papers 36 and 38. The reactant gas is supplied to grooves 66 from a manifold 72 that lies along one side 68 of the fuel cell, and exits the grooves 66 via another manifold 74 that lies adjacent the opposite side 70 of the fuel cell.

Figure 3:
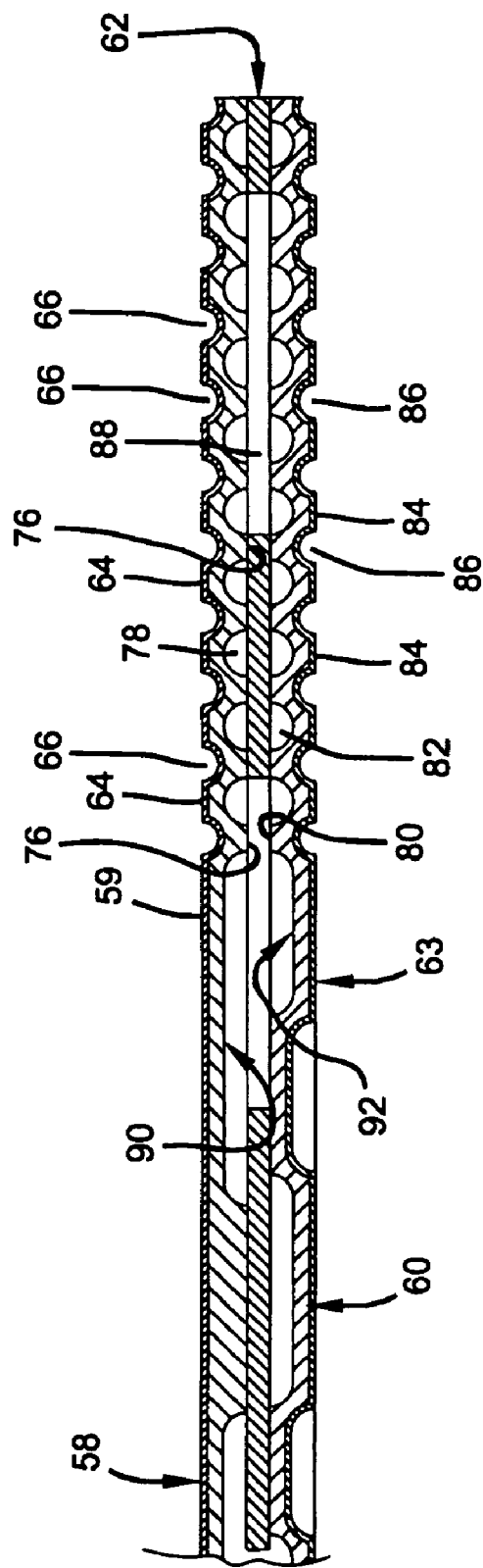
FIG. 3 is a partial cross-sectional view in the direction of 3-3 of FIG. 2.

As best shown in FIG. 3, the underside of the sheet 58 includes a plurality of ridges 76 which define therebetween a plurality of channels 78 through which coolant passes during the operation of the fuel cell. As shown in FIG. 3, the coolant channel 78 underlies each land 64 while a reactant gas groove 66 underlies each ridge 76. Alternatively, the sheet 58 could be flat and the flow field formed in a separate sheet of material. Metal sheet 60 is similar to sheet 58. The internal face 61 of sheet 60 is shown in FIG. 2. In this regard, there is depicted a plurality of ridges 80, defining therebetween, a plurality of channels 82 through which coolant flows from one side 69 of the bipolar plate to the other 71. Like sheet 58 and as best shown in FIG. 3, the external side of the sheet 60 has a working face 63. Sheet 60 is formed so as to provide a second flow field 65. The second flow field 65 is defined by a plurality of lands 84 thereon defining a plurality of grooves 86 which constitute the second flow field 65 through which the reactant gases pass.

An interior metal spacer sheet 62 is positioned interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence which enhances heat exchange with the inside faces 90 and 92 of the exterior sheets 58 and 60, respectively. Thus, channels 78 and 82 form respective coolant flow fields at the interior volume defined by sheets 58 and 60. Alternate embodiments (not shown) comprise two stamped plates joined together by a joining process to form interior coolant flow fields.

Figure 4:
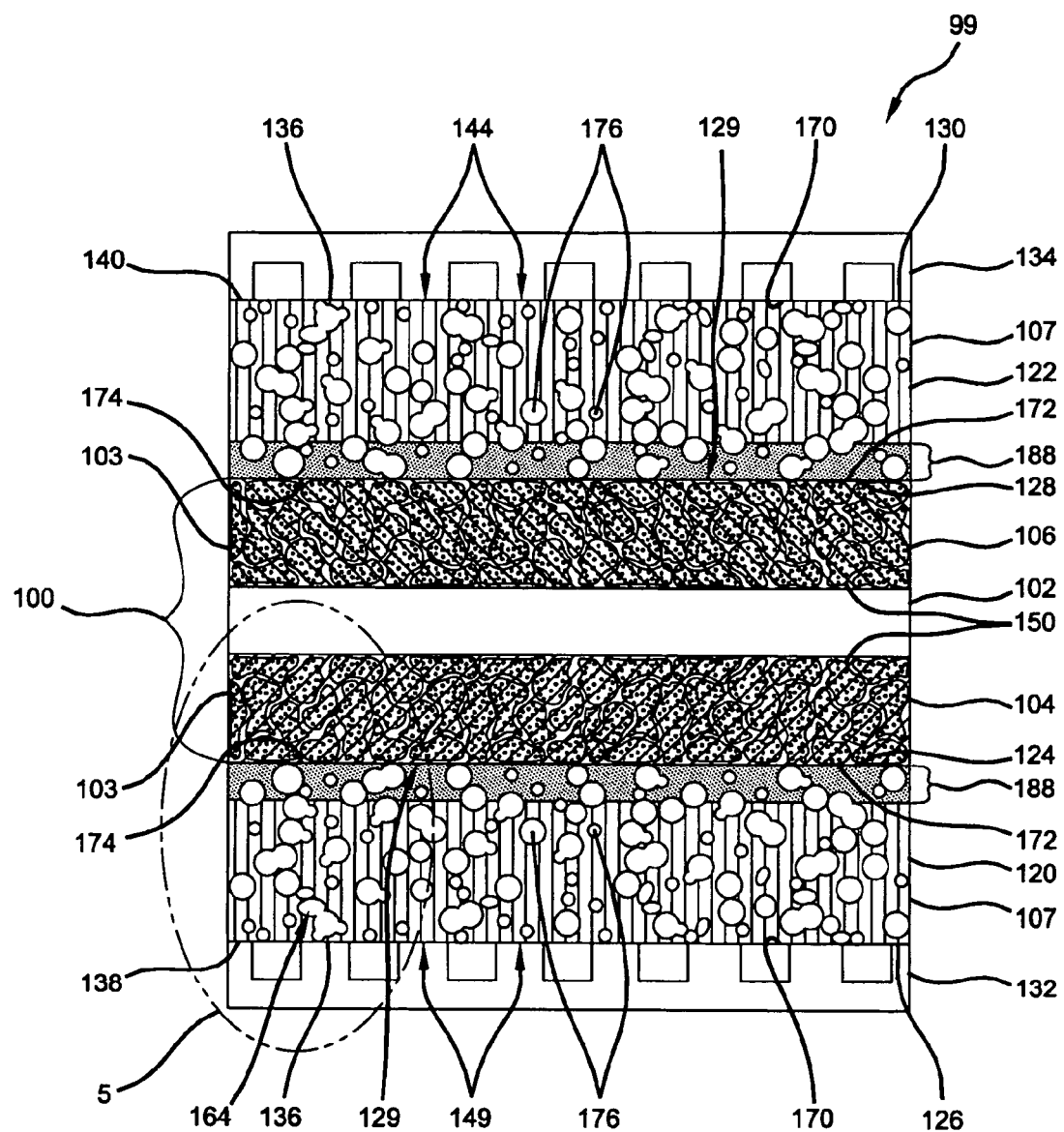
FIG. 4 is a not-to-scale side-sectional view of one preferred embodiment of a fuel cell assembly of the present invention where the metallized regions correspond to the entire surface of the layer of porous media facing a membrane-electrode-assembly (MEA)

In FIG. 4, a fuel cell 99 comprises a membrane-electrode-assembly (MEA) 100, similar to 6 of FIG. 1. The MEA 100 comprises a membrane 102 sandwiched between two electrodes 103. One electrode 103 is an anode 104 and the opposite electrode is a cathode 106, which are respectively bounded by electrically-conductive material known as "diffusion media" or porous fluid distribution media 107 which is analogous in function to 38 and 40 of FIG. 1. The membrane 102 provides for ion transport to facilitate reaction in the fuel cell 99 and is well known in the art as an ion conductive material. The electrodes 103 provide proton transfer by intimate contact between each electrode 104,106 and the ionomer membrane 102 to provide essentially continuous polymeric contact for such proton and transfer. The electrodes 103 are preferably well adhered to membrane 102.

In the present embodiment shown, there are two fluid distribution media layers 107 at each side of the MEA 100. A first fluid distribution media layer 120 confronts the anode 104, and a second fluid distribution media layer 122 confronts the cathode 106. The first fluid distribution media layer 120 comprises a first surface 124 and a second surface 126 opposite to the first surface 124. The second fluid distribution media layer 122 likewise comprises a third surface 128 and an opposite fourth surface 130. The first fluid distribution layer 120 is adjacent to the MEA 100, where the first surface 124 of the first media layer 120 confronts and preferably contacts the anode electrode 104. The second distribution layer 122 is also adjacent to the MEA 100 along the opposite cathode 106 side, where the third surface 128 of the second media layer 122 confronts and preferably contacts the cathode 106. The fluid distribution layers 107 preferably contact the respective electrodes 103 to form one or more electrical contact regions 129.

Each porous media layer 120,122 is bounded or sandwiched between the MEA 100 and a current collector separator plate substrate (132 or 134 analogous in function to 8 and 16 of FIG. 1). The porous media layers 107 serve to (1) distribute gaseous reactant over the entire face of the MEA 100, between and under the lands 136 of the current collector 132,134, and (2) collect current from the MEA 100. A first separator plate 132 surface or substrate (e.g. bipolar plate such as 8 of FIGS. 1 and 56 of FIG. 2) 138 is adjacent to and contacts a second surface 126 of the first fluid distribution media layer 120 and a second separator plate 134 surface 140 is adjacent to and contacts the fourth surface 130 of the second fluid distribution media layer 122. According to the present invention, it is preferred that the fluid distribution media 107 and the first and second substrates 132,134 are constructed of electrically conductive materials and electrical contact is established therebetween at one or more electrical contact regions 144 where an electrically conductive path is formed between a substrate sheet (132 or 134) and the corresponding porous media 107 (120 or 122). Further, it is preferred that the electrical contact is likewise established through the bulk of the porous media 107 and through the electrical contact regions 129 to the electrodes 103.

In electrochemical fuel cells 99 according to the present invention, the overall electrochemical reaction includes the oxidation of hydrogen to form water. The respective reactions at the anode (Reaction 1) and cathode (Reaction 2) are as follows:

$$H_2 \rightarrow 2H^+ + 2e^- \quad \text{(Reaction 1)}$$

$$\tfrac{1}{2}O_2 + 2H^+ + 2e^- \rightarrow H_2O \quad \text{(Reaction 2)}$$

where the reactant fuel is hydrogen and the oxidant comprises oxygen (such as, air, for example). The protons released by the reaction at the anode 104 migrate through the MEA 100 to the cathode 106 through the proton exchange membrane 102. In a simplified single fuel cell, the electrons released at the anode 104 are preferably conducted through an external circuit (not shown) connected to the cathode 106 which creates a current, as will be discussed in greater detail below.

The proton exchange membrane (PEM) 102 is a cation permeable, solid polymeric proton conductive recast ionomer membrane or sheet, having $H^+$ ions as the mobile ion, which are well known in the art. One broad class of cation exchange proton conductive resins is the so-called sulfonic acid cation exchange resin. These ion exchange membranes or sheets are well known in the art. The preferred membranes 102 are perfluorinated sulfonic acid polymer electrolyte membranes, commercially available under the trade name Nafion® sold by E.I. DuPont de Nemours & Co. Other similar membranes are sold by Asahi Glass and Asahi Chemical Company.

Figure 5:
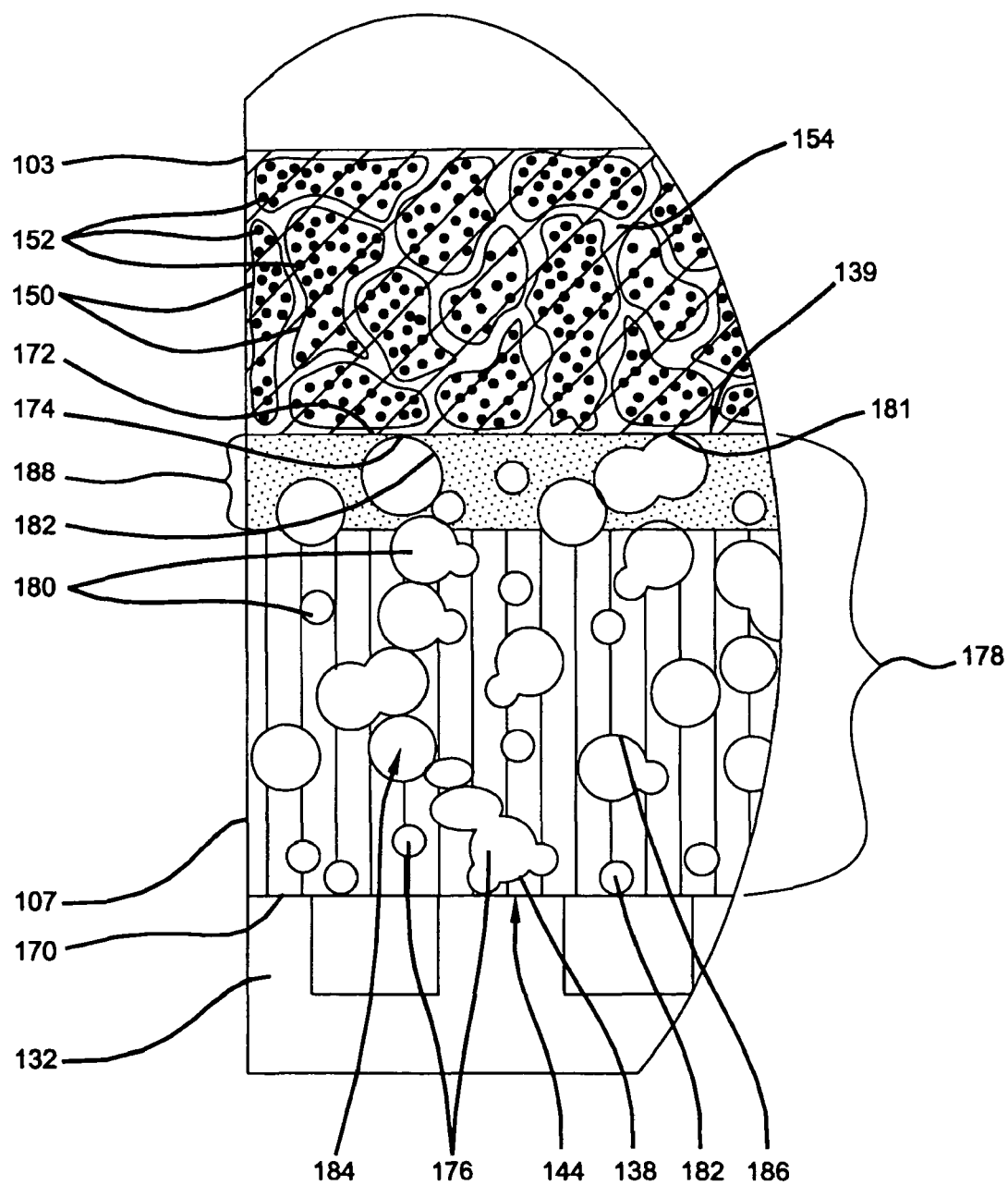
FIG. 5 is a magnified view of a section of FIG. 4.

As best shown in FIG. 5, a detailed view of a portion of FIG. 4, each of the electrodes 103 are formed of a corresponding group of finely divided carbon particles 150 supporting very finely divided catalytic particles 152 with a proton conductive material 154 intermingled with the particles 150 that support the catalyst particles 152. It should be noted that the carbon particles 150 forming the anode 104 may differ from the carbon particles 150 forming the cathode 106. In addition, the catalyst 152 composition and/or loading at the anode 104 may differ from the catalyst 152 loading at the cathode 106. Although the characteristics and loading of the carbon particles 150 and the catalyst 152 may differ for anode 104 and cathode 106, the basic structure of the two electrodes 103 is otherwise generally similar. In order to provide a continuous path to conduct $H^+$ ions to the catalyst 152 for reaction, the proton (cation) conductive material 154 is dispersed throughout each of the electrodes 103, and is intermingled with the carbon and catalytic particles 150, 152 and preferably is disposed in a plurality of the pores defined by the carbon particles 150. Accordingly, in FIG. 5, it can be seen that the proton conductive material 154 encompasses carbon and catalytic particles 150, 152. Additionally, the conductive support 150 and catalyst particles 152 are electrically conductive.

With general reference to FIGS. 4 and 5, a simplified fuel cell 99 operates by transferring electrons from the hydrogen splitting reaction (Reaction 1 above) at the anode 104 via an external circuit (not shown) to the cathode 106 where the recombination of electrons with $H^+$ and $O_2$ occurs via Reaction 2, as appreciated by one of skill in the art. However, in a stack of fuel cells, the electron transfer occurs through each bipolar plate (e.g., 132,134) where the fuel cells are electrically coupled to one another and preferably serially connected to generate a large potential difference across the stack. Leads connected to the terminal ends of the stack of fuel cells create an external circuit. Thus, one factor in catalyst activity of the electrode 103 is the efficient transfer of electrons to the catalyst 152 (in addition to oxygen and proton transport). Hence, the present invention provides reduced contact resistance between the fluid distribution layer 107 and the conductive particles 150 of the electrode 103, which thus translates to improved catalyst activity by improved electron transfer to the catalyst particles 152.

Further, another advantage of the present invention relates to water management of the fuel cell. Typically, product water is generated in the fuel cell reaction and rejected at the cathode 106 where the water typically escapes by simple flow or by evaporation. However, means may be provided if desired, for collecting the water as it is formed to carry it away from the fuel cell 99. Good water management in the cell enables successful long-term operation of electrochemical fuel cell 99. Spatial variations of water content within the membrane 102 of a current-carrying fuel cell result from the electro-osmotic dragging of water with proton ($H^+$) transport from anode 104 to cathode 106, the production of water by the oxygen reduction reaction at the cathode 104, humidification conditions of the inlet gas stream, and "back-diffusion" of water from cathode 106 to anode 104. It should be noted that for currently employed PEM membranes 102, preferred operational conditions to achieve optimum efficiency include a cathode 106 outlet relative humidity of 100% or greater. Previously, to achieve this humidity, both the anode 104 and cathode 106 reactant streams were externally humidified prior to entering the fuel cell 99, which necessitated humidification equipment. As will be discussed in greater detail below, one advantage of the present invention is a reduction and/or elimination of the need for external humidification of the cathode 106 and/or anode 104 inlet stream.

According to the present invention, the porous fluid distribution media 107 comprises an electrically conductive non-metallic composition. First external surfaces 170 of the fluid distribution media 107 refers to those surfaces (i.e., surfaces 126,130) of the first and second fluid distribution media layers 120,122 which contact the substrate element sheets 132, 134. Second external surfaces 172 (i.e., 124,128) of the fluid distribution media 120,122 are exposed to major surfaces 174 of the MEA 100. As used herein, "major surface" refers to a surface of an element having a greater dimension or surface area than other surfaces of the element, for example, an element that has an aspect ratio of greater width to height, where the surface area of the side corresponding to the element's height (e.g., thickness) is significantly smaller than the surface area of the width of the same element.

The fluid distribution media 107 is preferably highly porous (i.e. about 60%-80%), having a plurality of pores 176 formed within a body 178 of the fluid distribution media 107. "About" when applied to values indicates that the calculation or the measurement allows some slight imprecision in the value (e.g., with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value. The plurality of pores 176 comprise a plurality of internal pores 180 and external pores 182 that are open to one another and form continuous flow paths or channels 184 throughout the body 178 that extend from a first external surface 170 to the second external surface 172 of the fluid distribution media 107. Internal pores 180 are located within the bulk or body 178 of the fluid distribution media 107 and external pores 182 end at the distribution media layer 107 surface, for example, 170 or 172. As used herein, the terms "pore" and "pores" refers to pores of various sizes, including so-called "macropores" (pores greater than 50 nm diameter), "mesopores" (pores having diameter between 2 nm and 50 nm), and "micropores" (pores less than 2 nm diameter), unless otherwise indicated, and "pore size" refers to an average or median value including both the internal and external pore diameter sizes. It is preferred that the average pore size be equivalent to a radius of greater than about 2 µm and less than about 30 µm. Since these openings are disposed internally within the body 178 of fluid distribution media layers 107 (e.g. 120,122) the surfaces of the openings are referred to as internal surfaces 186, or the media interior.

According to the present invention, preferred non-metallic conductive fluid distribution media 107 comprises carbon. Such fluid distribution media 107 is well known in the art, and preferably comprises carbon fiber or graphite. The porous fluid distribution media 107 may be manufactured as paper, woven cloth, non-woven cloth, fiber, or foam. One such known porous fluid distribution media 107 comprises a graphite paper having a porosity of about 70% by volume, an uncompressed thickness of about 0.17 mm, which is commercially available from the Toray Company under the trade name Toray TGPH-060. In preferred fuel cell assemblies, Toray TGPH-060 is used on the anode side 104. Another preferred porous fluid distribution media 107 has about 70% by volume porosity, and is 0.26 mm thick, commercially available under the trade name TGPH-090, by Toray Company. It is preferred that such a fluid distribution media 107 is pretreated by grinding the side facing the MEA 100 to a final thickness of 0.17 mm, where it is placed on the cathode side 106. Reactant fluids are delivered to the MEA 100 via the fluid flow channels 184 within the first and second porous media layers 120,122, where the electrochemical reactions occur and generate electrical current.

Preferred materials of construction for the separator plate substrates 132,134 include conductive metals, such as stainless steel, aluminum, and titanium, for example. In preferred embodiments, the separator element 132,134 material is electrically conductive, and may form metal oxides when subjected to oxygen. The most preferred materials of construction for the separator plate substrates 132,134 are higher grades of stainless steel that exhibit high resistance to corrosion in the fuel cell, such as, for example, 316L, 317L, 256 SMO, carpenter 20, Inconel 601, Alloy 276, and Alloy 904L.

Electrical contact through an electrically conductive path at the contact regions 129 is dependent upon the relative electrical contact resistance at an interface of the surfaces (e.g., 172 to 174) of the contacting elements (107 and 103). Although non-metallic fluid distribution media 107 is preferred for its corrosion resistance, strength, physical durability in a fuel cell environment, and low bulk electrical resistance, it has been found that the interface between non-metal fluid distribution media 107 with either the electrodes 103 or metal substrates 132,134 can contribute to an increased electrical contact resistance at the interface due to the dissimilarity of the respective materials. For example, it is believed that the molecular interaction between a metal (e.g., substrate surface 138,140 or catalyst particles 152 in the electrode) and non-metal materials at such interfaces may increase the contact resistance due to differences in the respective surface energies and other molecular and physical interactions. In particular, the present invention provides a reduced electrical resistance (i.e., increased electrical conductivity and hence increased electron transfer) from the interface of the electrode surface 174 to the fluid distribution media layer 107 surface 172 as compared to an electrical resistance of a comparative porous media constructed of the same material but having non-metallized electrical contact regions with a similar MEA. In alternate preferred embodiments, the present invention further provides an overall reduction in the electrical resistance of the fuel cell assembly, by reducing the overall electrical resistance of the several assembled components of the fuel 99 cell via reduced resistance at interfaces with both surfaces 170,172 of the fluid distribution media layers 107 confronting the MEA 100 and separator element substrates 132,134, respectively.

Thus, the present invention provides a conductive metal coated on the outer surfaces 181 of the pores 176 of the porous non-metallic fluid distribution media 107 to form metallized regions 188. The metallized regions 188 are formed along the second external surfaces 172 of the porous media layer 107 that confront the major surfaces 174 of the MEA electrodes 103. The metallized regions 188 integrated with the fluid distribution media layer 107 at the second external surface 172 have been demonstrated to sustainedly reduce contact resistance when compared with fluid distribution media layers having no metal coating or metallized regions. It is preferred that the contact resistance at the interface of the electrodes 103 with the metallized regions 188 of electrically conductive fluid distribution element 107 of the present invention is less than 30 mOhm-cm$^2$ and more preferably less than 15 mOhm-cm$^2$. Although not limiting to the manner in which the present operation operates, it is believed that the conductive metallized regions 188 at the contact surface 172 of the fluid distribution media 107 provide an improved electrical interface at the contact regions 129 by providing a more electrically conductive interface (via the metallized regions 188) and further may be impacted by contacting more similar materials (i.e. catalyst metals 152) with correspondingly similar molecular and physical characteristics (e.g. surface energies). Thus, the present invention provides enhanced electrical conductivity, and consequently may allow for the ability to lower catalyst 152 loading in the electrodes 103 by such improved electrical conductivity, hence reducing fabrication cost for the fuel cell assembly 99.

In one preferred embodiment according to the present invention, the metallized regions 188 are ultra-thin and applied along the second external surface 172 of the fluid distribution media 107. "Ultra-thin" layers of conductive metal deposited within the metallized regions 188 generally refers to thicknesses less than about 40 nm, and most preferably less than 15 nm. The thickness of the metallized regions 188 is preferably less than about 10 nm, more preferably from between about 2 to about 10 nm, and most preferably between about 5 to about 10 nm along the surface 172 adjacent to the electrodes 103 of the MEA 100. It has been found experimentally that optimal water management (where sufficient water is retained to permit humidification of the membrane 102, while not flooding the electrodes 103) corresponds in certain embodiments to those where the metallized region 188 thickness on porous media layers 107 along the cathode side 106 of the MEA 100 is between about 5 to about 10 nm.

It is preferred that the metallized regions 188 are electrically conductive, oxidation resistant, and acid-resistant and in certain preferred embodiments the electrically conductive metal forming the metallized region comprises a compound containing a noble metal, selected from the group consisting of: ruthenium (Ru), rhodium (Rh), palladium (Pd), silver (Ag), iridium (Ir), platinum (Pt), osmium (Os), and mixtures thereof. Such compounds may comprise elemental forms of the conductive metal, or may comprise conductive compounds of metal nitrides, metal oxides, and metal carbides. Other preferred metals for the metallized regions 188 include those that comprise chromium (Cr), titanium (Ti), or tin (Sn). Electrically conductive compounds comprising such metals include, by way of example, chromium nitride (CrN), doped-tin oxide (SnO), and doped titanium oxide (TiO). A most preferred conductive metal for the metallized regions 188 comprises gold (Au). As recognized by one of skill in the art, the conductive metal composition may comprise mixtures of the above identified metals.

In the embodiment shown in FIG. 4, both the first and second fluid distribution layers 120,122 comprise metallized regions 188 on the surfaces facing the MEA 100. However, while not shown, but as appreciated by one of skill in the art, alternate preferred embodiments of the present invention apply to a fuel cell assembly 99 having metallized regions 188 on only one of the first or second fluid distribution layer surfaces 124,128 facing the MEA 100, rather than being applied to both the first and second fluid distribution layers 120,122.

Figure 6:
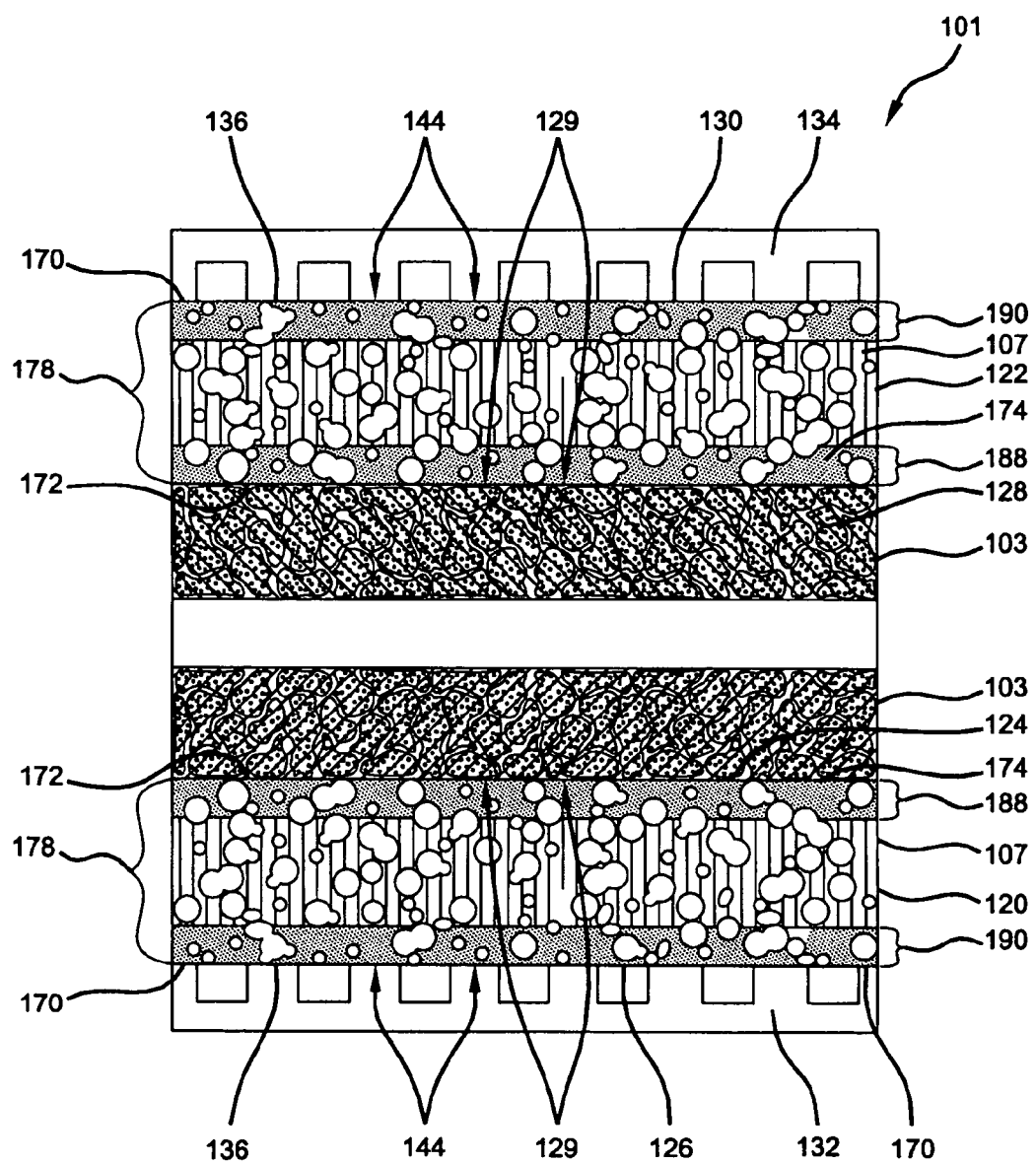
FIG. 6 is a not-to-scale side-sectional drawing showing an alternate embodiment according to the present invention comprising metallized regions along the entire surface of the layer of porous media facing an MEA and metallized regions along an entire surface of porous media facing separator plates.

FIG. 6 shows an alternate preferred embodiment of the present invention. Many aspects of the fuel cell assembly 101 are the same as the previous embodiment, such as that shown in FIGS. 5 and 6. The second surfaces 172 of the fluid distribution porous media layer 107 preferably comprise the same metallized regions 188 as described above to reduce the electrical resistance at the contact regions 129 between the porous media layer 107 and the electrodes 103. However, in the present embodiment, the first external surface 170, which is the side opposite to the second surface 172 of the porous media layer 107, is additionally coated with a conductive metal to form one or more metallized regions 190. The metallized regions 190 of the surfaces 126, 130 of respective porous media layers 120, 122 preferably contact the metal substrates 132,134 to form the electrical contact regions 144. It is believed that the metallized regions 188,190, and most particularly 190, on the porous fluid distribution media 107 provide more even electrical current distribution through the body 178 of the media 107 as the current approaches the discrete and non-continuous contact regions 144 associated with the lands 136 of the flow field configuration on the separator plate substrates 132,134.

In an alternate preferred embodiment, where the first external surface 170 comprises metallized regions 190, it is preferred that the thickness of the metallized regions is less than 80 nm, preferably less than 50 nm, and most preferably between about 2 to about 10 nm. In certain preferred embodiments of the present invention, the thickness of the metallized regions 190 is less than or equal to the depth of two atomic monolayers of the metal selected for the coating 190. As will be described in greater detail below, the preferred thicknesses of the respective metallized regions 188,190, may differ depending on the application, and desired thicknesses are related to both electrical conductivity and desired fuel cell operating conditions, including water management. However, the electrically conductive metal of the metallized regions 190 is preferably selected from the same compositions described above for the metallized regions 188. Likewise, the conductive metals of metallized regions 188 and 190 may be independently selected from one another, or may comprise the same composition, including the same electrically conductive metal(s).

It is preferred that the conductive metallized regions 188, 190 coat the external pore 182 outer surfaces 181 and the surfaces 186 of the internal pores 180 and extends into the body 178 of the fluid distribution media 107 at a depth of at least about 2 to about 10 nm from respective surfaces 170 or 172.

Figure 7:
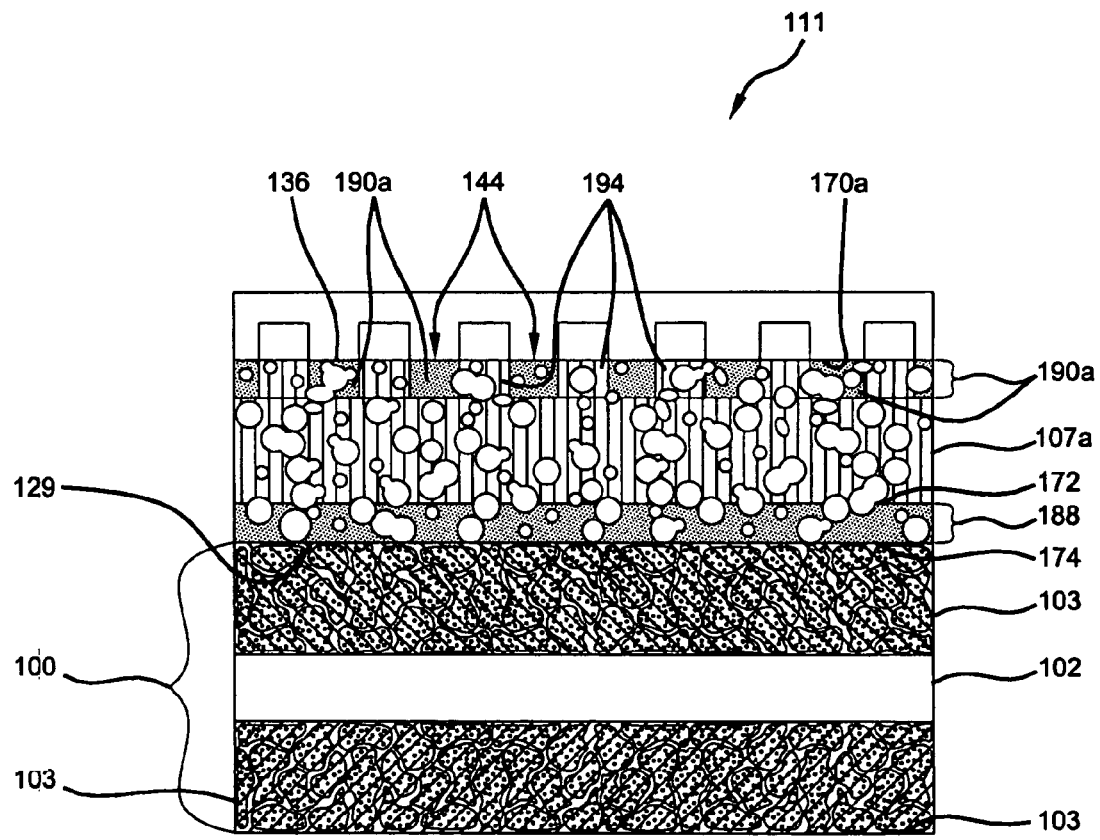
FIG. 7 is a not-to-scale partial side-sectional detailed view of a single layer of porous media adjacent to an MEA according to an alternate preferred embodiment of the present invention having metallized regions along the entire surface of the layer of porous media facing an MEA and along a surface of porous media facing separator plates where the metallized regions are discrete.

FIG. 7 shows another preferred embodiment of the present invention, depicting the MEA 100 and one-half of the fuel cell assembly 111. As appreciated by a skilled artisan, the present embodiment may also be employed along both sides of the MEA 100 to form the fuel cell assembly 111. The MEA 100 comprises the same elements as described in previous embodiments, including two electrodes 103 and a membrane 102. The fluid distribution media 107a comprises a first surface 170a and a second surface 172. The second surface 172 facing the major surface 174 of the MEA 100 has metallized regions 188 preferably at electrical contact regions 129, formed in the same manner as previous embodiments.

The first surface 170a of the fluid distribution media 107a comprises discrete metallized regions 190a of the porous media 107a which correspond to electrically conductive contact regions 144 of the external surface 170, and the non-metallized regions 194 correspond to the electrically non-conductive regions. Electrically conductive regions 190a include those areas that contact lands 136 and establish the electrically conductive path at the contact regions 144. In previously described embodiments, such as that in FIG. 6, the metallized regions 190 entirely cover the continuous external surface 170, which promotes more even current distribution into the body 178 of the porous media 107a. In the embodiment of FIG. 7 with discrete metallized regions 190a corresponding to electrically active contact regions 144, the electrically non-conductive and non-metallized regions 194 of external surfaces 170 are covered or masked while the conductive metal of the metallized regions 190a is applied. A mask is any material that is applied to a substrate and remains stable during coating application. Often, mask materials are selected to permit recovery and recycling of the metals deposited over the mask during the deposition process, and are well known in the art. Preferred mask materials compatible with the present invention include, by way of example, metals, such as stainless steel and titanium, or silicon and alumina based ceramics.

A variety of depositing methods may be employed to apply the conductive metal compositions that form the metallized regions (e.g., 188,190,190a) of the fluid distribution media 107. One preferred method of depositing the conductive metal of the metallized regions 188,190 onto the fluid distribution porous media 107 will now be described with reference to FIG. 8. In order to deposit the conductive metal onto the substrate, an ion-assisted, physical vapor deposition (PVD) method is employed.

Figure 8:
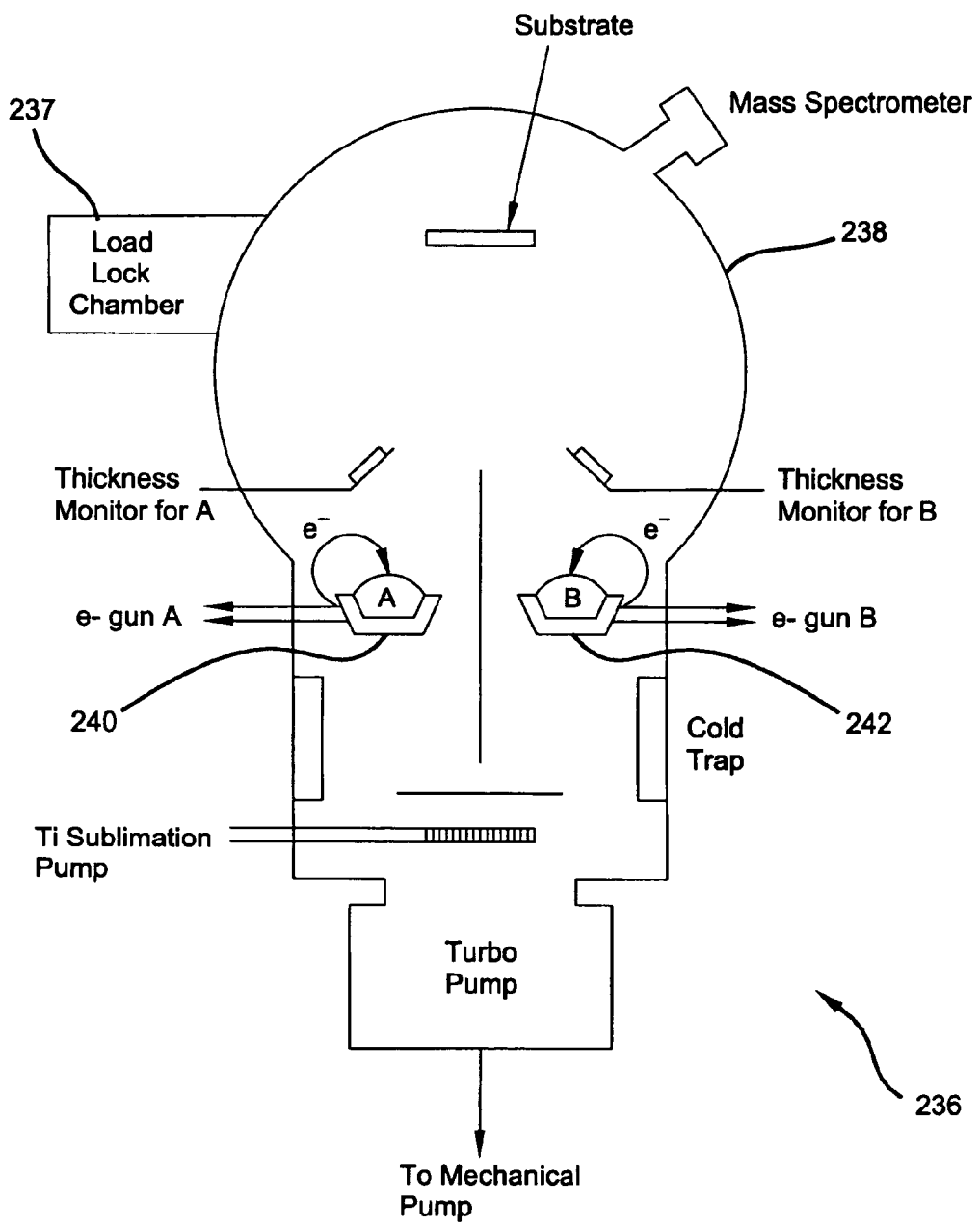
FIG. 8 is a an illustration of a physical vapor deposition apparatus used to metallize a surface of a porous fluid distribution media with an electrically conductive metal.

In FIG. 8, an ion-assisted PVD apparatus 236 is used to apply the conductive metal composition of the metallized regions 188,190. The apparatus 236 includes a deposition chamber 238 and two electron guns, A and B, for deposition of the metal coating. The apparatus 236 also includes a turbo pump which allows the apparatus to operated in an ultra-high vacuum. The substrate to be coated with the conductive metal is first placed in a "load-lock" chamber 237 where the pressure is between about $10^{-5}$ to $10^{-6}$ Torr or $1.3 \times 10^{-3}$ Pa to $1.3 \times 10^{-4}$ Pa. The substrate is then transferred to the deposition chamber 138. Once the substrate is placed into the chamber 238, the pressure is lowered to about $10^{-9}$ Torr ($1.3 \times 10^{-7}$ Pa). A first crucible 240 in the chamber holds the metal to be deposited. If a combination of metals or noble metals is to be deposited, a second metal is held by a second crucible 242. For example, the first crucible 240 contains a first metal (e.g. titanium) that is deposited as a first layer and crucible 242 contains a second metal (e.g. gold) which is deposited over the first layer, forming a second layer. Another option available may be to deposit a combination of metals simultaneously. Noble metals are deposited on the substrate at a rate of 0.10 nm/s to a thickness of less than 80 nm, which is observed by thickness monitors known in the art. The metal-lized regions 188,190,190a may have conductive metal deposited onto the substrate at ultra-low thicknesses of less than 80 nm, preferably less 40 nm, and most preferably about 2 to about 10 nm. When the metallized region 188,190 has a thickness of at least about 2 nm, it is preferably that the loading is 0.02 mg/cm². It is possible with the present process to coat only a very thin layer (i.e. an ultra-thin layer on the order of 2-20 nm), thereby achieving relatively uniform and good surface coverage, and good adhesion. Thus, the use of ion-assisted, PVD apparatus 236 allows the electrically conductive metal to be deposited on the substrate very smoothly, evenly, and in a thin layer.

Another preferred PVD method that is also suitable for the present invention, while not shown, is magnetron sputtering, where a metal target (the conductive metal for the metallized regions 188,190,190a) is bombarded with a sputter gun in an argon ion atmosphere, while the substrate is charged. The sputter gun forms a plasma of metal particles and argon ions that transfer by momentum to coat the substrate. Other preferred methods of applying a metal coating 188,190,190a according to the present invention include electron beam evaporation, where the substrate is contained in a vacuum chamber (from between about $10^{-3}$ to $10^{-4}$ Torr or about $1.3 \times 10^{-1}$ Pa to $1.3 \times 10^{-2}$ Pa) and a metal evaporant is heated by a charged electron beam, where it evaporates and then condenses on the target substrate. The conductive metal of the metallized regions 188,190,190a may also be applied by electroplating (e.g. electrolytic deposition), electroless plating, chemical vapor or pulse laser deposition.

Preferred embodiments of the present invention provide a low contact resistance across the separator plate substrates 132,134 through the porous media 107 having the metallized regions 188,190,190a to the MEA 100. It is preferred that the contact resistance across an entire fuel cell (from separator plate to separator plate) is less than 100 mOhm/cm² (mOhm/cm²) and more preferably less than 80 mΩ/cm² where the fuel cell is under compressive force. Further, electrically conductive substrate elements 132,134 according to certain preferred embodiments of the present invention do not require the removal of a passivation layer (i.e. metal oxide layer) from the metallic separator plate substrates 132,134 along contact surfaces 138,140 prior to their incorporation into the fuel cell assemblies (for example, 99,101,111) of the present invention. Generally, a metal substrate 132,134 having an oxide layer that contacts a non-metallic fluid distribution layer (without metallized regions 190) creates an impermissibly high electrical contact resistance. Thus, prior art methods of removing the oxide layer include a variety of methods, such as cathodic electrolytic cleaning, mechanical abrasion, cleaning the substrate with alkaline cleaners, and etching with acidic solvents or pickle liquors. Eliminating the necessity for removing the metal oxides from the contact surfaces 138,140 of the metallic separator plate 132,134 is thus optional in accordance with the certain preferred embodiments of the present invention.

Thus, one preferred aspect of the present invention includes employing the separator element substrate 132,134 comprising stainless steel, where the substrate surface 132, 134 does not require the extensive removal of a passivation layer from the contact surface 138,140, such as disclosed in commonly assigned U.S. patent application Ser. No. 10/704, 015 filed on Nov. 7, 2003. The improved electrical conductivity at the interface at the contact regions 144 provided by the metallized region coating 190 on the porous media 107 permits use of metals in the separator element substrates 132,134 that have a naturally occurring oxide layer at the contact surface 138,140. Hence, the present invention eliminates or significantly simplifies the costly and time intensive pre-processing step of removing some or substantially all of the metal oxides from the contact surface 138,140 of the metal substrates 132,134. Further, higher grades of stainless steel previously discussed have a high corrosion resistance, and thus can be used without any further protective treatment due to their ability to withstand the corrosive environment within the fuel cell.

The present invention is also suitable for use with separator plate element substrates 132,134 that are coated with electrically conductive protective coatings that provide corrosion resistance to the underlying metal substrate 132,134. Such coatings may comprise oxidation and corrosion resistant metal coating 190 layers (e.g. Au, Ag, Pt, Pd, Ru, Rh, Ir, Os, and mixtures thereof) or corrosion resistant electrically conductive polymeric matrices, which generally comprise oxidation resistant polymers dispersed in a matrix of electrically conductive corrosion resistant particles, as are known in the art. The protective coatings preferably have a resistivity less than about 50 ohm-cm ($\Omega$-cm) and comprise a plurality of oxidation-resistant, acid-insoluble, conductive particles (i.e. less than about 50 microns) dispersed throughout an acid-resistant, oxidation-resistant polymer matrix, where the polymer binds the particles together and holds them on the surface 138,140 of the metal substrate 132,134. The coating contains sufficient conductive filler particles to produce a resistivity no greater than about 50 $\mu$ohm-cm, and has a thickness between about 5 $\mu$m and about 75 $\mu$m depending on the composition, resistivity and integrity of the coating. Cross-linked polymers are preferred for producing impermeable coatings which protect the underlying metal substrate surface from permeation of corrosive agents.

Preferably, the conductive filler particles are selected from the group consisting of gold, platinum, graphite, carbon, nickel, conductive metal borides, nitrides and carbides (e.g. titanium nitride, titanium carbide, titanium diboride), titanium alloyed with chromium and/or nickel, palladium, niobium, rhodium, rare earth metals, and other nobel metals. Most preferably, the particles will comprise carbon or graphite (i.e. hexagonally crystallized carbon). The particles comprise varying weight percentages of the coating depending on the density and conductivity of the particles (i.e., particles having a high conductivity and low density can be used in lower weight percentages). Carbon/graphite containing coatings will typically contain 25 percent by weight carbon/graphite particles. The polymer matrix comprises any water-insoluble polymer that can be formed into a thin adherent film and that can withstand the hostile oxidative and acidic environment of the fuel cell. Hence, such polymers, as epoxies, polyamide-imides, polyether-imides, polyphenols, fluoroelastomers (e.g., polyvinylidene flouride), polyesters, phenoxy-phenolics, epoxide-phenolics, acrylics, and urethanes, inter alia are seen to be useful with the present invention. In such an embodiment, where the surfaces 138,140 are overlaid with a protective coating, the metal substrates 132,134 comprise a corrosion-susceptible metal such as aluminum, titanium, or lower grade stainless steel that is coated with a corrosion resistant protective coating.

In certain embodiments of the present invention, it is preferred that the contact surfaces 138,140 of the separator element metal substrates 132,134 are essentially clean, where loosely adhered contaminants are removed, prior to incorporation into the electrically conductive element. Such cleaning typically serves to remove any loosely adhered contaminants, such as oils, grease, waxy solids, particles (including metallic particles, carbon particles, dust, and dirt), silica, scale, and mixtures thereof. Many contaminants are added during the manufacturing of the metal material, and may also accumulate on the contact surface 138,140 during transport or storage. Thus, cleaning of the contact surface 138,140 of the metal substrate 132,134 is especially preferred in circumstances where the metal substrate 132,134 is soiled with contaminants. Cleaning of the metal substrate 132,134 may entail mechanical abrasion; cleaning with traditional alkaline cleaners, surfactants, mild acid washes; or ultrasonic cleaning. The choice of the appropriate cleaning process or sequence of cleaning processes is selected based upon both the nature of the contaminant and the metal.

Experimental details regarding one preferred embodiment of the present invention will now be described in detail. In certain preferred embodiments the fluid distribution media differs for the anode 104 and the cathode 106 sides. As previously described, Toray TGPH 060 is preferably used for the anode side 104, which is 0.17 mm thick, whereas the cathode side 106 distribution media is Toray TGPH 090 which is 0.26 mm thick. It is preferred that the Toray TGPH 090 is pretreated by coating the outer surface with polytetrafluouoethylene (PTFE) and then ground on one side to a final thickness of 0.17 mm. Thus, gold was deposited by ion-assisted PVD onto both types of Toray fluid distribution media graphite paper. In the first experiment, gold was deposited by PVD onto the Toray paper by a Teer magnetron sputter system. The Toray paper was introduced into the vacuum chamber and when the pressure in the vacuum chamber reached $5 \times 10^{-5}$ the deposition of Au was done. The magnetron targets were 99.99% pure Au. The Au deposition was done at −50V bias potential using 0.25 A current for one minute to achieve a gold coating 130 thickness of 10 nm. Au was deposited at a rate of 0.16 nm/s using magnetron sputter system. The thickness of the samples was calibrated using electron probe microanalysis (EPMA). The deposition temperature was about 25° C. to about 30° C.

Figure 9:
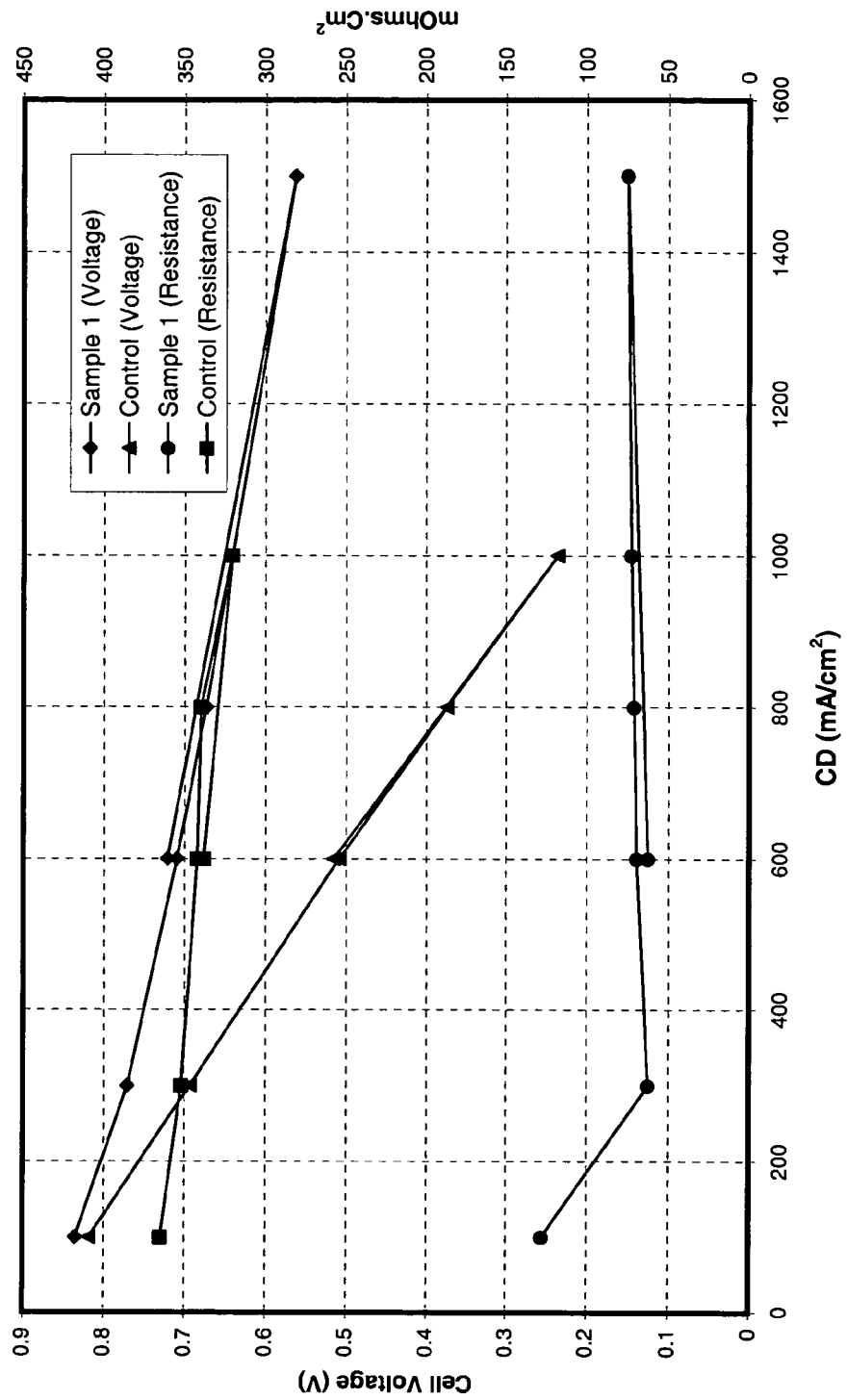
FIG. 9 is a graph comparing a measurement of contact resistance and voltage achieved through a fuel cell assembly according to the present invention having metallized regions on two opposite surfaces of a layer of porous media (where one surface faces an MEA and an opposite surface faces separator plates) compared with a prior art uncoated 317L stainless steel plate contacting a prior art porous fluid distribution media.

As shown in FIG. 9, two fuel cell assemblies were prepared and analyzed for a performance comparison. Sample 1 was prepared in accordance with the present invention, by depositing metallized regions to two sides of two similar layers of Toray diffusion media as in the experiment described above. The cathode side Toray paper TGPH 090 was pretreated prior to metal deposition to impart hydrophobicity by dipping the paper into polytetrafluouoethylene (PTFE), and then physically grinding down one side to achieve a final thickness of approximately 0.17 mm. The PTFE coated side contacts the separator element (such as 134 of FIG. 6) and the ground side faces the MEA (such as 100 of FIG. 6). A similar Toray diffusion media TGPH 060 was prepared with metallized regions on two sides. The fluid diffusion media were each arranged adjacent to and sandwiching a GORE MEA 5510, which was 25 $\mu$m thick and had a catalyst loading of 0.4 mg/cm$^2$, such that the metallized regions contact the MEA surfaces. Each Toray paper layer was bounded by impermeable metal separator plates (such as 132,134 of FIG. 6), constructed of uncoated and untreated 317L stainless steel. The metallized regions of the exterior surfaces of each Toray diffusion media layer were arranged to contact the untreated stainless steel separator plate.

The Control comprises a prior art impermeable separator plate constructed of a 317L stainless steel without any coatings or pretreatment. The fuel cell was assembled with the same Toray diffusion media for the anode and cathode side as described immediately above, however the Toray media did not have any metallized regions. Each Toray diffusion media was arranged to sandwich opposite sides of an MEA. The Toray diffusion media are each surrounded by and contacting the uncoated and untreated stainless steel plates.

The contact resistance was measured in the fuel cell using current interruption method with Scribner Associate Software. Contact resistance measurements were measured as milli-Ohm centimeter squared (mΩ·cm$^2$) through a cycle of applied current density through a range of 100, 300, 600, 800, 1000, and 1500 mA/cm$^2$. The fuel cell was operated with a hydrogen to air stoichiometry of 2/2 pressurized to 25 psig (approximately 175 kPa) and the anode inlet was 100% relative humidity, the cathode inlet was operated dry (approximately 0% relative humidity). The outlet humidity was measured as approximately (114%)

As can be observed from the data, the total cell resistance of Sample 1 is significantly lower than the control throughout the entire cycle of applied current. Further, the cell voltage for Sample 1 was greater throughout the experiment and substantially greater at higher applied current (600-1000 mA/cm$^2$) corresponding to typical fuel cell operating conditions. Thus, Sample 1 of the present invention demonstrated a significant improvement in performance by exhibiting higher voltage potential and reduced resistance through all ranges of current applied, as compared to the prior art control.

Thus, the present invention provides a method for manufacturing an assembly for a fuel cell, comprising depositing an electrically conductive metal on a surface of an electrically conductive porous media to form one or more metallized regions having an ultra-thin thickness. The surface having the metallized regions is positioned adjacent to an electrode of the MEA. The electrode is contacted with the surface having the metallized regions to form an electrically conductive path between the substrate and the porous media.

One advantage of the present invention relates to improved water management. As previously discussed, optimal efficiency of the fuel cell occurs where the outlet humidity from the cathode is 100% relative humidity or greater. Maintaining sufficient water content in the fuel cell to prevent drying of the membrane has typically been a significant problem during operations, thus, the inlet streams to both the anode and cathode are humidified, usually to a target of at least 100%. It was discovered upon testing, that where the sample was prepared with metallized regions along both sides of the Toray fluid distribution media (as in Sample 1) and the fuel cell was operated to have a typical inlet humidity to the cathode of 100% relative humidity (which is a standard target for cathode inlet humidity), the fuel cell was inundated with excess water and in some circumstances flooded. Thus, in contravention to known prior art, the present invention reduces the need for external humidification of inlet reactant streams to the MEA.

Figure 10:
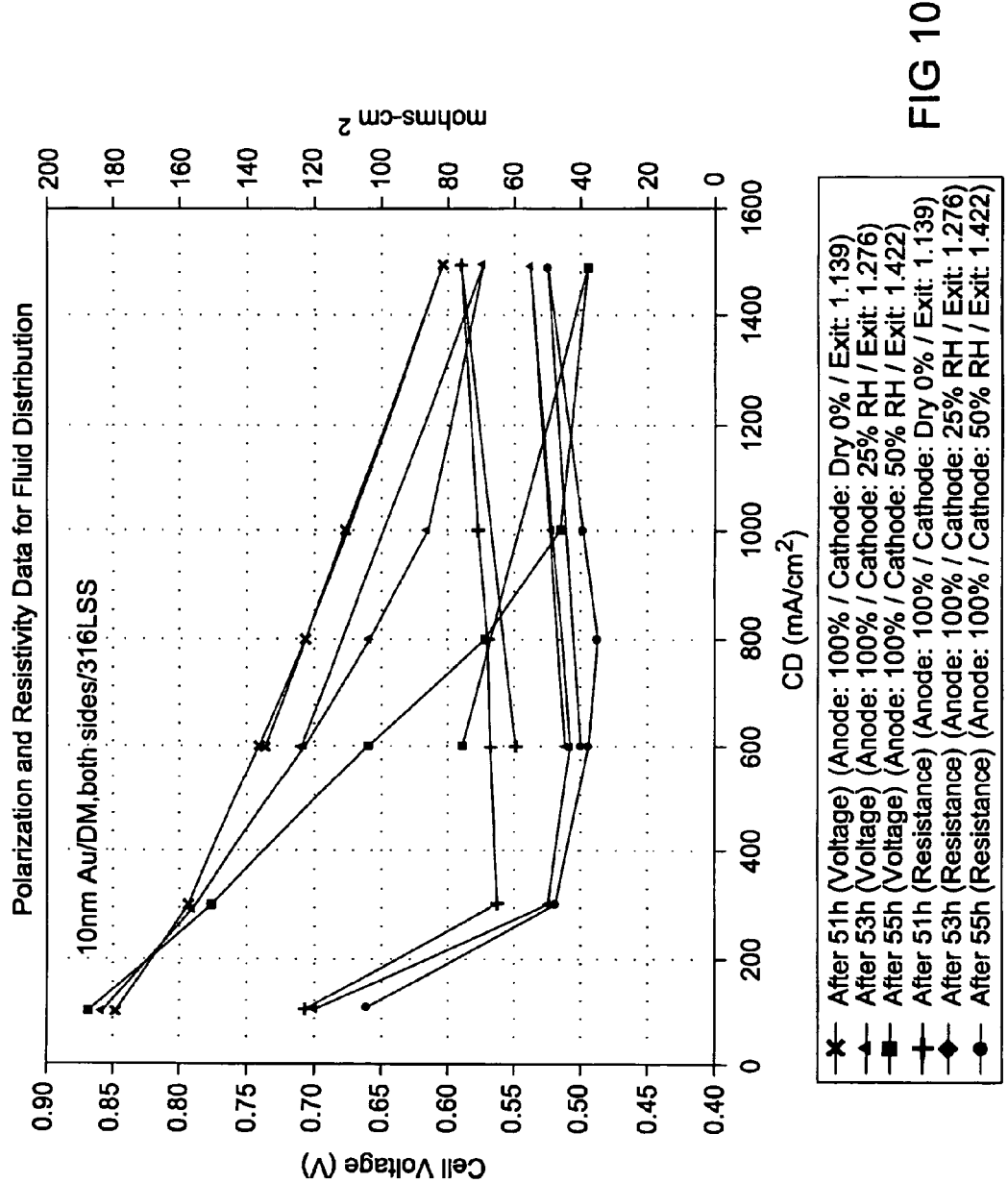
FIG. 10 is a graph of contact resistance and voltage values achieved by an electrically conductive fluid distribution element according to the present invention, wherein the relative humidity of the cathode inlet is varied to demonstrate overall cell performance.

In FIG. 10, Sample 1 was tested at various cathode inlet relative humidity levels to demonstrate the improved water management aspects of the present invention. As previously described, the fuel cell assembly used was arranged to have a Gore MEA 5510 with 0.4 mg/cm$^2$ loading of Pt catalyst sandwiched by Toray paper treated in accordance with the present invention, thus having metallized regions disposed on both an interior and an exterior surface which are bounded by and in contact with an untreated 317L stainless steel impermeable substrates. The fuel cell was operated with the following conditions: 25 psig (approximately 175 kPa), hydrogen to air stoichiometric ratio of 2/2. In all operating scenarios, the anode inlet was operated at 100% relative humidity. The cathode inlet relative humidity was varied in the following amounts: approximately 0% (dry ambient conditions), 25%, and 50%. Previous experiments at 100% cathode inlet relative humidity demonstrated impermissible flooding conditions, and thus was not tested here.

A dry cathode inlet of approximately 0% relative humidity demonstrated the best performance, having a cell voltage of 0.61 V at a current density of 1.5 mA/cm$^2$, as compared to the mere 0.5 V at 50% cathode inlet relative humidity. Thus a drop in cell performance of 200 mV was observed by increasing the cathode relative humidity from dry to 50%. The cell resistance was likewise low and remained below 80 mOhm/cm$^2$ at a current density of 1.5 mA/cm$^2$ for all humidity values. Throughout all of the cathode inlet humidity values, the cathode exit humidity was likewise monitored. As previously mentioned, the proton conductivity is greatest through the membrane when the cathode outlet humidity is 100% or greater. As can be seen in FIG. 10, the relative humidity at the cathode exit well exceeded 100% for all operating scenarios, and at its lowest value was 114%, where the cathode inlet was 0%. Thus, according to the present invention, the membrane is operated under favorable saturation conditions on the cathode side, while no additional external humidification is necessary.

In some prior art embodiments, coating the metal substrate of the bipolar plates, in particular stainless steel substrates, with a protective metal coating has created high MEA contamination, which can lead to poisoning of the catalyst (and hence catalyst inactivation) or overall deactivation of the proton conductive material in the membrane and electrodes over the lifespan of the fuel cell. However, in embodiments where the stainless steel forms a passivation layer of metal oxides, such contamination does not generally occur. Thus, one additional advantage of the present invention, is the optional use of an untreated stainless steel separator plate, which reduces MEA contamination, and thus reduces the potential of catalyst poisoning and overall inactivation of the membrane and electrodes.

The present invention provides a method of operating a fuel cell comprising positioning an electrically conductive porous media between a membrane electrode assembly (MEA) and an electrically conductive substrate. The porous media has a first surface having ultra-thin metallized regions, where the first surface faces the MEA. A second surface faces the conductive substrate. The first surface having the metallized regions is contacted with the MEA and the second surface facing the substrate forms an electrically conductive path from the substrate through the porous media to the MEA. The contacting is generally accomplished by imparting compressive force on the fuel cell in an assembled fuel cell stack. An electrochemical reaction is conducted in the MEA which generates electrons. Thus, the present method comprises conducting electrons to or from the MEA via the electrically conductive path while operating the fuel cell.

A reactant stream is introduced to a cathode side of the MEA while conducting the reaction. The reactant stream is delivered through the conductive porous media and does not require external humidification in certain embodiments. In certain preferred embodiments of the present invention, the reactant stream delivered to a cathode side of the MEA consists essentially of ambient air, and the ambient air is not intentionally humidified, or in the alternative the ambient air has a relative humidity of less than ambient conditions.

In alternate preferred embodiments, the reactant stream introduced to the cathode side of the MEA for the reaction is externally humidified prior to entry into the MEA at less than saturation conditions. In preferred embodiments of the present invention, the reactant stream introduced to a cathode side of the MEA has a water content of less than a saturation level. In alternate preferred embodiments, the second surface of the porous media further comprises one or more metallized regions comprising an electrically conductive metal for reducing electrical resistivity between the substrate and the porous media. As appreciated by one of skill in the art, the porous media according to the present invention may be arranged on both sides of the MEA.

Conductive elements prepared in accordance with the present invention provide fuel cells with highly efficient and optimized fuel cell operation. The present invention provides an improved electrical interface between the non-metallic porous fluid distribution media and the electrodes of the MEA, which reduces electrical resistance and increases catalyst activity. Such increased catalyst activity can reduce the catalyst loading requirements in the electrodes of the MEA and thus reduce manufacturing expenses. Additionally, the conductive porous fluid distribution media according to the present invention improve fuel cell water management by eliminating the need for external humidification of the cathode inlet stream while maintaining adequate hydration of the membrane in the MEA.

Further, alternate preferred embodiments of the present invention likewise reduce the electrical resistance between the non-metallic porous fluid distribution media and the metallic substrate of the separator element, to provide an overall lower electrical resistance across the fuel cell. The metallized regions of the present invention provide an ultra-thin conductive metal coating that sufficiently covers the surface of the porous fluid distribution element to provide a low contact resistance for an electrically conductive fluid distribution element, which improves the overall performance of a fuel cell. Furthermore, the thickness of the metal coating is such that the manufacturing cost of preparing an electrically conductive fluid distribution element is minimized. Processing costs are further reduced by eliminating the step of removing metal oxides from metal substrates that will form an electrical interface with the fluid distribution element. The improved electrical interface reduces contact resistance and promotes more widespread and even current distribution, which will increase the operational efficiency and overall lifetime of the membrane and the fuel cell stack.

The description of the above embodiments and method is merely exemplary in nature and, thus, variations that do not depart from the gist of the invention are intended to be within the scope of the invention. Such variations are not to be regarded as a departure from the spirit and scope of the invention.

What is claimed is:

1. A fluid distribution element for a fuel cell having a membrane electrode assembly (MEA), the element comprising:
a layer of electrically conductive porous media comprising carbon and one or more metallized regions on a surface of said layer confronting the MEA, said one or more metallized regions comprising an electrically conductive metal deposited on surfaces of pores of said porous media, and wherein said one or more metallized regions contact a major surface of the MEA and form respective electrically conductive paths between the MEA through said interconnected pores of said porous media to at least one bipolar plate, wherein said surface of said layer is a first surface and said layer further comprises a second surface opposite to said first surface, wherein said second surface contacts an impermeable electrically conductive separator element, wherein said second surface has one or more metallized regions comprising an electrically conductive metal.

2. The element of claim 1, wherein each of said metallized regions provides a reduced electrical resistivity through said respective electrically conductive paths as compared to a non-metallized region of porous media.

3. The element of claim 1, wherein said one or more metallized regions have an ultra-thin thickness, wherein said ultra-thin thickness is less than about 40 nm.

4. The element of claim 1, wherein a thickness of each of said metallized regions is less than about 10 nm.

5. The element of claim 1, wherein a thickness of each of said metallized regions is between about 5 nm to about 10 nm.

6. The element of claim 1, wherein said porous media is selected from the group consisting of: paper, woven cloth, non-woven cloth, fiber, and foam.

7. The element of claim 1, wherein said electrically conductive metal of said metallized regions comprises a noble metal.

8. The element of claim 1, wherein said metallized regions comprise a compound of said electrically conductive metal.

9. The element of claim 1, wherein said metallized regions comprise a metal selected from the group consisting of: Ru, Rh, Pd, Ag, Ir, Pt, Os, Ti, Cr, Sn, Au, and mixtures thereof.

10. The element of claim 1, wherein said electrically conductive metal comprises Au.

* * * * *